United States Patent
Teyeb et al.

(10) Patent No.: US 9,924,442 B2
(45) Date of Patent: Mar. 20, 2018

(54) CELL SELECTION MECHANISM IN MOBILE RELAY OPERATION

(75) Inventors: Oumer Teyeb, Stockholm (SE); Muhammad Kazmi, Bromma (SE); Gunnar Mildh, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 922 days.

(21) Appl. No.: 13/499,952

(22) PCT Filed: Jan. 16, 2012

(86) PCT No.: PCT/SE2012/050032
§ 371 (c)(1),
(2), (4) Date: Apr. 3, 2012

(87) PCT Pub. No.: WO2013/051978
PCT Pub. Date: Apr. 11, 2013

(65) Prior Publication Data
US 2013/0084884 A1     Apr. 4, 2013

Related U.S. Application Data

(60) Provisional application No. 61/542,855, filed on Oct. 4, 2011.

(51) Int. Cl.
*H04W 24/00* (2009.01)
*H04W 48/04* (2009.01)
*H04W 64/00* (2009.01)

(52) U.S. Cl.
CPC ............ *H04W 48/04* (2013.01); *H04W 64/00* (2013.01)

(58) Field of Classification Search
CPC ............ H04L 29/08108; H04W 60/00; H04W 36/30; H04W 36/32; H04W 64/00
USPC ...... 455/414.1, 435.1, 436, 438, 440, 456.1, 455/456.5
See application file for complete search history.

(56) References Cited

U.S. PATENT DOCUMENTS

| | | | |
|---|---|---|---|
| 6,246,874 B1 * | 6/2001 | Voce .................. | H04B 7/18541 455/13.1 |
| 6,985,731 B1 | 1/2006 | Johnson et al. | |
| 8,156,539 B1 * | 4/2012 | Nelson .............................. | 726/2 |
| 8,812,050 B1 * | 8/2014 | Bencheikh ..................... | 455/525 |
| 2003/0100299 A1 * | 5/2003 | Ko et al. ....................... | 455/423 |

(Continued)

FOREIGN PATENT DOCUMENTS

| WO | 0158182 A2 | 8/2001 |
|---|---|---|
| WO | 2007103975 A2 | 9/2007 |

OTHER PUBLICATIONS

Ericsson et al., "LTE Positioning Measurements," 3GPP TSG RAN WG1 Meeting #58, Aug. 24-28, 2009, R1-093606, Shenzhen, China.
Alcatel-Lucent, "Recommendations on performance Requirements for Positioning Support for LTE," 3GPP TSG RAN WG4 (Radio) Meeting #52, Aug. 23-28, 2009, R4-092960, Shenzhen, China.

(Continued)

*Primary Examiner* — Anthony Addy
*Assistant Examiner* — Matthew Genack
(74) *Attorney, Agent, or Firm* — Coats & Bennett, PLLC

(57) ABSTRACT

The present invention relates to a method in a radio network node of a cellular network, for controlling admission of a UE in a cell covering a region. The method comprises obtaining (710) a location of the UE, comparing (720) information related to a geometric boundary of the region and the obtained location of the UE, and determining (730) whether to admit the UE in the cell based on the comparison.

40 Claims, 12 Drawing Sheets

(56) References Cited

U.S. PATENT DOCUMENTS

| | | | |
|---|---|---|---|
| 2005/0202780 A1* | 9/2005 | Kall | H04W 8/10 |
| | | | 455/1 |
| 2009/0323533 A1* | 12/2009 | Ohta | 370/236 |
| 2010/0234071 A1* | 9/2010 | Shabtay et al. | 455/562.1 |
| 2010/0246539 A1* | 9/2010 | Guillouard et al. | 370/336 |
| 2010/0279704 A1* | 11/2010 | Vachhani | 455/453 |
| 2011/0098048 A1* | 4/2011 | Zhang et al. | 455/438 |
| 2011/0310881 A1* | 12/2011 | Kenington | H04J 3/0644 |
| | | | 370/350 |
| 2012/0082028 A1* | 4/2012 | Kojima | 370/230 |
| 2012/0302254 A1* | 11/2012 | Charbit et al. | 455/456.1 |

OTHER PUBLICATIONS

3GPP. "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)." 3GPP TS 36.300 V10.5.0. Sep. 2011. 3GPP, Sophia Antipolis, France.

3GPP. "Technical Specification Group Radio Access Network; Evolved Universal Terrestrial Radio Access (E-UTRA); Physical Channels and Modulation (Release 10)." 3GPP TS 36.211 V10.3.0. Sep. 2011. 3GPP, Sophia Antipolis, France.

3GPP. "Technical Specification Group Radio Access Network; Evolved Universal Terrestrial Radio Access Network (E-UTRAN); Self-configuring and self-optimizing network (SON) use cases and solutions (Release 9)." 3GPP TR 36.902 V9.3.1. Mar. 2011. 3GPP, Sophia Antipolis, France.

3GPP. "Technical Specification Group Radio Access Network; Evolved Universal Terrestrial Radio Access Network (E-UTRAN); S1 Application Protocol (S1AP) (Release 10)." 3GPP TS 36.413 V10.3.0. Sep. 2011. 3GPP, Sophia Antipolis, France.

3GPP. "Technical Specification Group Radio Access Network; Evolved Universal Terrestrial Radio Access Network (E-UTRAN); X2 layer 1 (Release 9)." 3GPP TS 36.421 V9.0.2. Mar. 2011. 3GPP, Sophia Antipolis, France.

3GPP. "Technical Specification Group Radio Access Network; Evolved Universal Terrestrial Radio Access Network (E-UTRAN); X2 signalling transport (Release 10)." 3GPP TS 36.422 V10.1.0. Jun. 2011. 3GPP, Sophia Antipolis, France.

3GPP. "Technical Specification Group Radio Access Network; Evolved Universal Terrestrial Radio Access Network (E-UTRAN); X2 application protocol (X2AP) (Release 10)." 3GPP TS 36.423 V10.3.0. Sep. 2011. 3GPP, Sophia Antipolis, France.

* cited by examiner

CELL SELECTION MECHANISM IN MOBILE RELAY OPERATION

TECHNICAL FIELD

The disclosure relates to admission of a User Equipment (UE) in a cell covering a specific region, such as the region within the boundaries of a vehicle covered by a mobile relay cell.

BACKGROUND

The Universal Mobile Telecommunication System (UMTS) is one of the third generation mobile communication technologies designed to succeed the Global System for Mobile communications (GSM). Long Term Evolution (LTE) is a project within the $3^{rd}$ Generation Partnership Project (3GPP) to improve the UMTS standard to cope with future requirements in terms of improved services such as higher data rates, improved efficiency, and lowered costs.

FIG. 1 illustrates a cellular network with a serving node 101 that serves a UE 103 located within the serving node's geographical area of service, called a cell 105, Depending on the system, the serving node 101 may e.g. be a base station, a Node B, or an evolved Node B (eNodeB or eNB). Hereinafter, the serving node 101 will be referred to as an eNB in the non-limiting example of an LTE system.

Relay Nodes

Relay Nodes (RNs) are one of the earliest proposals to extend the coverage of cellular networks. Apart from this, RNs could also help to enhance capacity in hotspots and to increase the effective cell throughput. Also, the average radio-transmission power at the UE could be greatly reduced, especially in highly shadowed areas, thereby leading to longer UE battery life.

It is due to the aforementioned advantages of relaying that LTE-Advanced, the standardization of which is currently being finalized in 3GPP, has introduced support for RNs. The LTE-Advanced standard corresponds to Rel-10 of LTE.

An RN cell, as specified in Rel-10, appears to a UE as a separate cell distinct from the donor cell. The RN cells have their own Physical Cell Identity (PC) as defined in LTE Rel-8 and transmit their own synchronization channels, and reference symbols. The UE receives scheduling information and Hybrid Automatic Repeat-reQuest (HARQ) feedback and other control signaling directly from the RN and sends its control channels to the RN. A type I RN appears as a Rel-8 eNB to Rel-8 UEs, i.e. it is backwards compatible. This means basically that from a UE perspective, there is no difference being served by an eNB or a type I RN.

FIG. 2 illustrates a RN 204 with a service area or cell 207, the RN 204 communicating with a so called donor eNB (DeNB) 202 with a service area or cell 206, and one or several UEs 203 located within the RN's cell 207. Transmissions between UE 203 and RN 204 are done over a radio interface denoted Uu, which is the same as for regular eNB to UE communication. Transmissions between the RN 204 and the DeNB 202 are made over a radio interface denoted Un, which reuses much of the functionality of the Uu interface. This means that the DeNB 202 handles the RN 204 as a UE. The DeNB thus provides backhaul transport for the RN and all the UEs connected to the RN. The signaling and the radio protocols used on the Un interface are based on the Uu interface of the LTE Rel-8 standard with only small additions and modifications. An overview of the relay support in LTE Rel-10 is described in 3GPP TS 36.300, chapter 4.7.

FIG. 3 illustrates the overall Evolved Universal Terrestrial Radio Access Network (E-UTRAN) 300, which is the radio network of the LTE system architecture for support of RNs. The RN 304 terminates the S1/X2 interfaces in the same way as a normal eNB 301. The S1 interface is however not directly connected to the Mobility Management Entity and/or Service Gateway MME/SGW 308a-b as for normal eNBs 301, but instead the S1 control messages and data are forwarded between the RN 304 and the S1 interface associated with the DeNB 302. The RN 304 has an S1 interface setup towards the MME/SGW 308a-b, which is proxied in the DeNB 302. The RN 304 may also have an X2 interface setup towards other eNBs 301, in which case the X2 interface is proxied in the DeNB 302.

The S1 user plane protocol stacks for supporting RNs are shown in FIG. 4a. There is a GTP tunnel associated with each UE Evolved Packet System (EPS) bearer, spanning from the SGW 408 associated with the UE to the DeNB 402, which is switched to another GTP tunnel in the DeNB 402, going from the DeNB 402 to the RN 404 in a one-to-one mapping.

Similarly, the X2 user plane protocol stacks for supporting RNs during inter-eNB handover are also proxied via the DeNB 402, as shown in FIG. 4b. There is a GTP forwarding tunnel associated with each UE EPS bearer subject to forwarding, spanning from the other eNB 401 to the DeNB 402, which is switched to another GTP tunnel in the DeNB 402, going from the DeNB 402 to the RN 404 in a one-to-one mapping.

The user plane packets are mapped to radio bearers over the Un interface. The mapping can be based on the QCI associated with the UE EPS bearer. UE EPS bearer with similar QoS can be mapped to the same Un radio bearer.

Mobile RNs

Providing high throughput and short handover interruption time for UEs in scenarios where several UEs are traveling at high speed together, for example in trains and buses, is challenging and it can cause signaling overhead over the air interface. Also, the possibility of handover failures increases as many almost simultaneous HO requests are initiated to a given neighboring cell. Mobile RNs, also called mobile relays, are one of the proposed solutions for solving the problem of high speed group mobility in e.g. mobile public transport, as illustrated in FIG. 5.

As shown in FIG. 5, mobile RNs 509a-b are installed on top of trains and buses, and UEs inside the moving vehicles are connected to these RNs instead of externally installed eNBs 501 or fixed RNs 504. As long as a UE is inside the moving vehicle, it doesn't have to change its serving node, which is the mobile RN 509a or 509b, no matter how many cells the vehicle traverses during the journey. Instead, the RN 509a/b will be handed over from one DeNB to another and through that process, the traffic and signaling for all UEs connected to the mobile RN 509a/b will be transferred from the core network to these UEs via another DeNB. Since in this case only the RN 509a/b is handed over between DeNBs, compared to several individual UEs 503 being handed over between eNBs, the radio signaling may be optimized in accordance with the so-called group mobility.

To enable the operation of a mobile RN, a re-assignment of the DeNB is required. This process can be accomplished in a manner similar to a UE handover, where the mobile RN is sending measurement reports of the DeNB cells it can hear to the currently serving DeNB. The measurement reports are evaluated to determine when the RN should be relocated to a neighbor DeNB. In LTE Rel-10, only static or fixed RNs are supported, but mobile RNs are a possible addition in Rel-11.

Network Management Architecture

A network management architecture is illustrated in FIG. 6, describing the situation when the RN and the eNB are from different vendors. From the top, the network is managed by the Network Management (NM) system 601 handling equipment from all vendors via the standardized Itf-N interface. Equipment from each vendor is handled by one or several Domain Management (DM) systems 602a-b, sometimes stated to include Element Management (EM). Such systems are also referred to as Operations And Maintenance (OAM or O&M) systems, or Operations and Support Systems (OSS) 602a-b. These systems manage the Network Elements (NE) 603a-c which can be eNBs and RNs, and also other elements.

In LTE, two eNBs, 603a and 603b, can be interconnected via the X2 interface for information exchange. RNs in the network are controlled, just like any UE, by the Radio Resource Control (RRC) protocol, which has been extended with certain relay-specific functionality. Bearers are also set up to carry X2 and S1 interfaces between RN and its donor eNB, as well as to carry O&M traffic between RN and its DM/EM. If the eNB and the RN are from the same vendor, both nodes can be managed by the same DM/EM.

Automatic Neighbor Relations

The PCI is an essential configuration parameter of a radio cell. PCIs are grouped into 168 unique physical layer cell identity groups, each group containing three unique identifies. Thus, there are only 504 different Pas altogether. Limiting the number of Pas makes the initial PCI detection by the UE during cell search easier, but the limited number of PCIs inevitably leads to the reuse of the same PCI values in different cells. Therefore, a PCI may not uniquely identify a neighbor cell, and each cell additionally broadcasts, as a part of the System Information (SI), a Globally unique Cell Identifier (CGI).

When a new node, such as an eNB or a RN, is brought into the field, a PCI needs to be selected for each of its supported cells, avoiding collision with respective neighboring cells. The use of identical PCI by two cells in close proximity results in interference conditions that might hinder the identification and use of any of them. Otherwise, if both cells have a common neighbor, handover measurements that are based on PCI will become ambiguous thus leading to confusing measurement reports or even to the handing over of a UE to the wrong cell, which can cause Radio Link Failure (RLF).

The PCI assignment shall fulfill the following two conditions:
1. Collision-free: The PCI is unique in the area that the cell covers.
2. Confusion-free: a cell shall not have more than one neighboring cell with identical PCI.

Using an identical PCI for two cells creates collision, which can only be solved by restarting at least one of the cells and reassigning Pas upon restart, causing service interruption. PCI confusion, on the other hand, can be resolved by instructing UEs to read the CGI of the concerned neighbor cell. UEs need to be assigned long enough idle periods, for example using DRX configuration with long DRX cycles, in order to read the CGI from the broadcast channels of neighbor cells. Therefore, putting a PCI in use which causes confusion is highly undesirable as the UE might have to be requested to decode the CGI, which can cause service interruption from the serving cell during the CGI measurement duration.

Traditionally, a proper PCI is derived from radio network planning and is part of the initial configuration of the node. The network planning tool calculates the possible PCIs for the new cell(s) based on estimated neighbor relations of the new cells, as estimated by cell coverage area predictions. However, prediction errors, due to imperfections in map and building data, and to inaccuracies in propagation models, have forced operators to resort to drive/walk tests to ensure proper knowledge of the coverage region and identify all relevant neighbors and handover regions. Even the accuracy of that is questionable as some factors such as seasonal changes, such as the falling of leaves or snow melting, can alter the propagation conditions. Also, the inaccuracy of cell coverage and neighbor relation assessment increases with time as the live network and its surroundings evolve over time.

LTE has a feature known as UE Automatic Neighbor Relations (ANR), which allows UEs to decode and report the CGI information of neighbor cells to the serving cell upon request, in addition to the PCI which is included in almost all measurement reports. eNBs maintain a Neighbor Relation Table (NRT) for each of their cells. Apart from the PCI to CGI mapping, each neighbor relation contains other relevant information such as the possibility of X2 connectivity.

The CGI of the neighbor cells are the ones that are used when signaling to the neighbor eNB via the MME, since the MME routes the messages based on eNB identity which is a part of CGI. If the policy is to establish X2 for neighbor relations and if X2 is not already available, then the CGI can be used to recover the target node's IP address, which is used for X2 setup. When the X2 interface is established, the neighboring eNBs can share information about their served cells including PCIs and CGIs. It is also possible to share such information via OAM.

Positioning

Several positioning methods for determining the location of a target device, which may e.g. be a UE, a mobile RN, or a Personal Digital Assistant (FDA) exist. Some well-known methods are;
   Satellite based methods
   Observed time difference of arrival (OTDOA)
   Uplink time difference of arrival (UTDOA)
   Enhanced cell ID
   Hybrid methods
   The above methods are briefly described below.

Satellite Based Positioning Methods

Global Navigation Satellite System (GNSS) is the standard generic term for satellite navigation systems that enable the target device to locate their position. Another generic term currently used in the literature for satellite based positioning method is Galileo and Additional Navigation Satellite System (GANSS). Among others, the global positioning system (GPS) is the most well-known example of GNSS, which is currently in operation and has been so for more than a decade.

The assisted GNSS (A-GNSS) or assisted GPS (A-GPS) is tailored to work with the target device, and thus enables the device to relatively accurately determine its location, time, and even velocity including direction in an open area environment, provided a sufficient number of satellites are visible. Among various positioning methods, A-GPS is considered to be one of the most viable and commonly used one. The A-GPS can be UE based or UE assisted. In both cases the network node, e.g. the eNB, sends assistance data such as satellite information to the target device to facilitate the GPS measurements. However in UE based A-GPS, the target device or UE reports measurements to the network which in turn determines the location of the device. In the latter case the target device itself finds its location based on assistance data and measurements.

OTDOA

In OTDOA, the target device measures the timing differences of downlink Positioning Reference Signals (PRS) received from multiple distinct locations e.g. eNBs. For each measured neighbor cell, the UE measures RSTD. The RSTD is the relative timing difference between a neighbor cell and a reference cell. The UE position estimate is the intersection of hyperbolas corresponding to the measured RSTDs. At least three RSTD measurements from geographically dispersed base stations with a good geometry are needed to accurately determine the UE location coordinates. In UE assisted OTDOA method, the UE sends the RSTD measurements to the positioning node, which in turns uses the RSTD measurements to determine the UE location. In UE based OTDOA method, the UE performs RSTD measurements as well as determine its location.

In both UE based and UE assisted OTDOA, the positioning node, for example the Evolved Serving Mobile Location Center (E-SMLC) in LTE, provides assistance data to the UE to facilitate the RSTD measurements. The assistance data includes information such as cell identities, their reference timing, PRS bandwidth, and periodicity of PRS.

UTDOA

In the UTDOA positioning method, several network radio nodes, called Location Measurement Units (LMU), perform measurements on uplink signals transmitted by the target devices. The LMU is typically located at the base station, eNB or DeNB sites, but it may also be located as a separate unit in a network. The LMUs communicate with the positioning node (e.g. E-SMLC in LTE). The LMUs send measurements done on UE uplink signals to the positioning node which in turn determines the location of the target device.

Enhanced Cell ID (E-CID)

The E-CID positioning method uses the network knowledge of geographical areas associated with cell IDs and additionally one or more UE and/or base station measurement(s) to determine the location of the target device. The measurements include at least the Cell Identification (CID) and the corresponding geographical location, such as coordinates, of the serving cell. Examples of the additional measurements are:

Timing Advance (Tadv). Tadv is derived from eNB Rx-Tx time difference measurement and/or UE Rx-Tx time difference measurement.

Angle of arrival (AoA) measured at the base station.

Signal strength measurement, e.g. path loss/path gain, RSRP from serving and neighboring cells.

Signal quality measurement, e.g. RSRQ from serving and neighboring cells.

Inter-RAT measurements, e.g. CPICH RSCP, CPICH Ec/No, GSM carrier RSSI.

A fingerprinting positioning method typically makes use of signal strength and/or signal quality such as RSRP/RSRQ. Therefore the fingerprinting method is a special type of E-CID positioning method.

Hybrid Methods

The hybrid positioning methods combine more than one positioning method to enhance the positioning accuracy of the target device. For example, the A-GNSS measurements and E-CID measurements can be used in combination to determine the location of the target device.

UE Measurements

Measurements are done by the UE on the serving as well as on neighbor cells over some known reference symbols or pilot sequences. Some measurements may also require the UE to measure the signals transmitted by the UE in the uplink.

In a multi-carrier or carrier aggregation scenario, the UE may perform the measurements on the cells on the primary component carrier (FCC) as well as on the cells on one or more secondary component carriers (SCCs). The measurements are done for various purposes. Some example measurement purposes are: mobility, positioning, Self-Organizing Network (SON) functionality, Minimization of Drive Tests (MDT), O&M, network planning and optimization.

The measurements may also comprise cell identification, e.g. PCI acquisition of the target cell, CGI or E-UTRAN CGI acquisition of the target cell, or SI acquisition of the target cell. The target cell can be an LTE or any other radio access technology cell.

Examples of mobility measurements in LTE are measurements of:

Reference symbol received power (RSRP)

Reference symbol received quality (RSRQ)

Examples of inter-RAT mobility measurements are measurements of

Common pilot channel received signal code power (CPICH RSCP)

CPICH Ec/No

GSM Received Signal Strength Indicator (RSSI)

Examples of well-known positioning measurements in LTE are measurements of

Reference signal time difference (RSTD)

RX-TX time difference

The UE served by a mobile RN performs measurements on signals transmitted by the RN. In addition the UE may also be required to perform measurements on neighboring cells served by normal base stations and/or by a fixed RN.

Mobility Scenarios

The measurements described in the previous section can be used to enable UE mobility. These measurements are also applicable for a UE camped on or served by the mobile RN.

Fundamentally there are two kinds of UE mobility states:
1. Low activity state mobility e.g. cell reselection.
2. Connected state mobility e.g. handover, cell change order, RRC connection release with re-direction. RRC connection re-establishment, primary cell (PCell) change in multi-carrier system, and primary component carrier (PCC) change in multi-carrier system.

In LTE there is only one low activity mobility state called idle state. In High-Speed Packet Access (HSPA) there are following low activity states: Idle state, URA_PCH state, CELL_PCH state, and CELL_FACH state.

Nevertheless, in any low activity state the UE autonomously performs cell reselection without any direct intervention of the network. But to some extent the UE behavior in low activity mobility state scenario could still be controlled by a is number of broadcasted system parameters and performance specification.

In HSPA the connected state is also called as CELL_DCH state since at least a dedicated channel (DCH) is in operation for at least the maintenance of the radio link quality.

The handover on the other hand is fully controlled by the network through explicit UE specific commands and by performance specification. Similarly, an RRC re-direction upon connection release mechanism is used by the network to re-direct the UE to change to another cell which may belong to the RAT of the serving cell or to another RAT. In this case the UE upon receiving the RRC re-direction upon connection re/ease command typically goes in idle state, searches for the indicated cell/RAT, and accesses the new cell/RAT. In both low activity state and connected state the mobility decisions are mainly based on the same kind of downlink neighbor cell measurements, which were discussed in the previous section.

Both Wideband Code Division Multiple Access (WCDMA) and E-UTRAN are frequency reuse-1 systems. This means the geographically closest or physical adjacent neighbor cells operate on the same carrier frequency. An operator may also deploy multiple frequency layers within the same coverage area. Therefore, idle mode and connected mode mobility in both WCDMA and E-UTRAN could be broadly classified into three main categories, for both low activity and connected states:

1. Intra-frequency mobility
2. Inter-frequency mobility
3. Inter-RAT mobility

In intra-frequency mobility UE moves between the cells belonging to the same carrier frequency. This is the most important mobility scenario since it involves less cost in terms of delay as mobility measurements can be carried out in parallel with channel reception. In addition an operator would have at least one carrier at its disposal that he would like to be efficiently utilized.

In inter-frequency mobility the UE moves between cells belonging to different carrier frequencies but of the same access technology. This could be considered as the second most important scenario.

In inter-RAT mobility the UE moves between cells that belong to different access technologies such as between WCDMA and GSM or vice versa, or between WCDMA and LTE or vice versa, and so on.

As already mentioned above, a mobile RN will typically be deployed in a movable vehicle, such as a bus, a boat, or a train, either on the outside of the vehicle, such as on top or on the side of the vehicle, or on the inside of the vehicle. A large number of subscribers is typically located in the small area of the vehicle. Due to vehicle mobility it is advantageous that all subscribers inside the vehicle are served by the mobile RN. This can be realized provided that all the UEs belonging to these subscribers are camped on or connected to the mobile RN and not to external base stations. The vehicle housing the mobile RN may arrive at a location where there exists UEs outside the vehicle which are closer to the vehicle and the mobile RN than to an external base station. However, it may be advantageous to prevent UEs which are not inside the vehicle from camping on or connecting to the mobile RN. One reason is that external UEs camping on or connecting to the mobile RN may cause ping pong in cell selection and handovers since the mobile RN typically moves, although it may stop from time to time, and therefore moves away from the external UE. Furthermore, it may also cause a capacity problem if external UEs camps on or connects to the mobile RN, as the mobile RN has a limited capacity adapted to the possible amount of UE's in the vehicle. A scenario with similar problems as the mobile RN scenario described above is the scenario when a WiFi access point or an ordinary base station such as a pico base station or a fixed RN is used for serving a small coverage area, such as a coffee shop. In such a scenario, a user with a UE may be walking by on the street outside the coffee shop, and this may cause the same unwanted ping pong effect for handovers or cell selection as described above.

In various known approaches, the UEs inside a vehicle served by a mobile RN or in a specific coffee shop served by a base station can be connected to the mobile RN or the base station by reading a specific indicator broadcasted by the mobile RN/base station, or by means of detectors or sensors. In one example, door sensors may be used sensing when a UE is entering or leaving the vehicle or coffee shop. However such methods are not supported by the legacy UEs. Furthermore, as sensor based methods requires a complex implementation, several UEs may not support such feature even in future releases. The sensors may also be specific to e.g. a vehicle type, which means that UEs supporting such a mechanism for a specific type of vehicle may not use it in all types of vehicles.

SUMMARY

There is thus a need to address the cell selection and handover issues mentioned above for all type of UEs including legacy UEs in the mobile RN operation scenario and in the similar coffee shop scenario described above. It is therefore an object to address some of the problems outlined above, and to provide a less complex solution for controlling cell selection and handover in such scenarios. This object and others are achieved by the methods and nodes according to the independent claims, and by the embodiments according to the dependent claims.

In accordance with a first embodiment, a method in a radio network node of a cellular network, for controlling admission of a UE in a cell covering a region is provided. The method comprises obtaining a location of the UE, and comparing information related to a geometric boundary of the region and the obtained location of the UE. The method also comprises determining whether to admit the UE in the cell based on the comparison.

In accordance with a second embodiment, a radio network node of a cellular network, configured to control admission of a UE in a cell covering a region, is provided. The radio network node comprises a processing circuit configured to obtain a location of the UE, compare information related to a geometric boundary of the region and the obtained location of the UE, and determine whether to admit the UE in the cell based on the comparison.

In accordance with a third embodiment, a method in a UE of a cellular network, for controlling access attempts to radio resources associated with a cell covering a region is provided. The method comprises receiving information related to a geometric boundary of the region, and determining a location of the UE based on a positioning method. The method also comprises comparing the received information related to the geometric boundary and the determined location, and determining whether to attempt access to radio resources associated with the cell based on the comparison.

In accordance with a fourth embodiment, a method in a radio network node of a cellular network, for supporting a UE's access to radio resources associated with a cell controlled by the radio network node, is provided. The cell is covering a region. The method comprises transmitting information related to a geometric boundary of the region to the UE, such that the UE can determine whether to attempt access to radio resources associated with the cell based on a comparison of the information related to the geometric boundary and a location of the UE.

In accordance with a fifth embodiment, a UE of a cellular network, configured to control access attempts to radio resources associated with a cell covering a region is provided. The UE comprises a receiver configured to receive information related to a geometric boundary of the region. The UE also comprises a processing circuit configured to determine a location of the UE based on a positioning method, compare the received information related to the geometric boundary and the determined location, and determine whether to attempt access to radio resources associated with the cell based on the comparison.

In accordance with a sixth embodiment, a radio network node of a cellular network, for supporting a UE's access to radio resources associated with a cell controlled by the radio network node, is provided. The cell is covering a region. The radio network node comprises a transmitter configured to transmit information related to a geometric boundary of the region to the UE, such that the UE can determine whether to attempt access to radio resources associated with the cell based on a comparison of the information related to the geometric boundary and a location of the UE.

An advantage of embodiments is that handover and cell selection of UEs inside and outside a specific region with radio communication coverage, such as a mobile RN cell covering a vehicle, or a base station cell or WiFi access point area covering a coffee shop, may be controlled such that mainly UEs inside the specific region are served by the mobile RN cell, base station cell, or WiFi access point area.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the embodiments are primarily described in the form of methods and nodes, they may also be embodied in a computer program product as well as in a system comprising a computer processor and a memory coupled to the processor, wherein the memory is encoded with one or more programs that may perform the functions disclosed herein.

Figure 1:
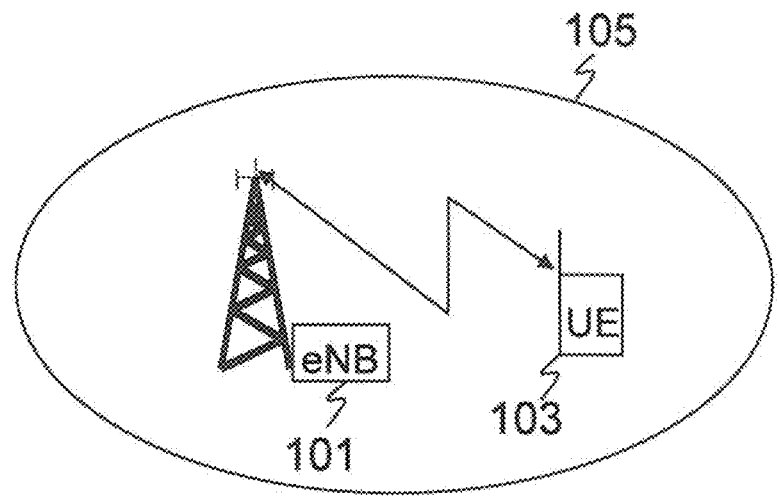
FIG. 1 is a schematic illustration of an eNB and a UE in an E-UTRAN.
Figure 2:
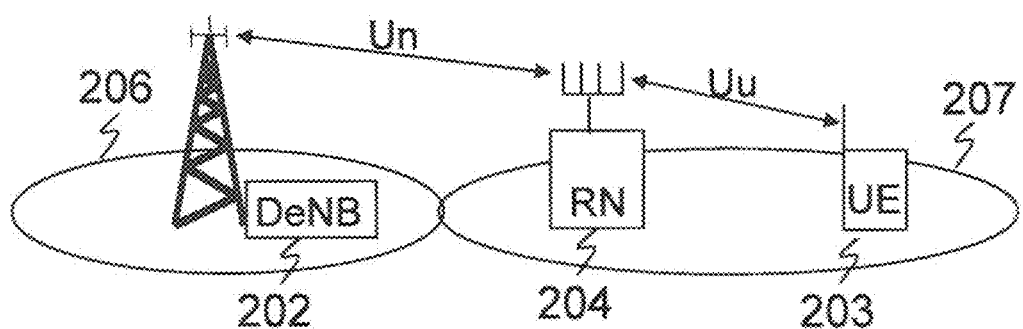
FIG. 2 is a schematic illustration of a DeNB, a RN, and a UE in an E-UTRAN.
Figure 3:
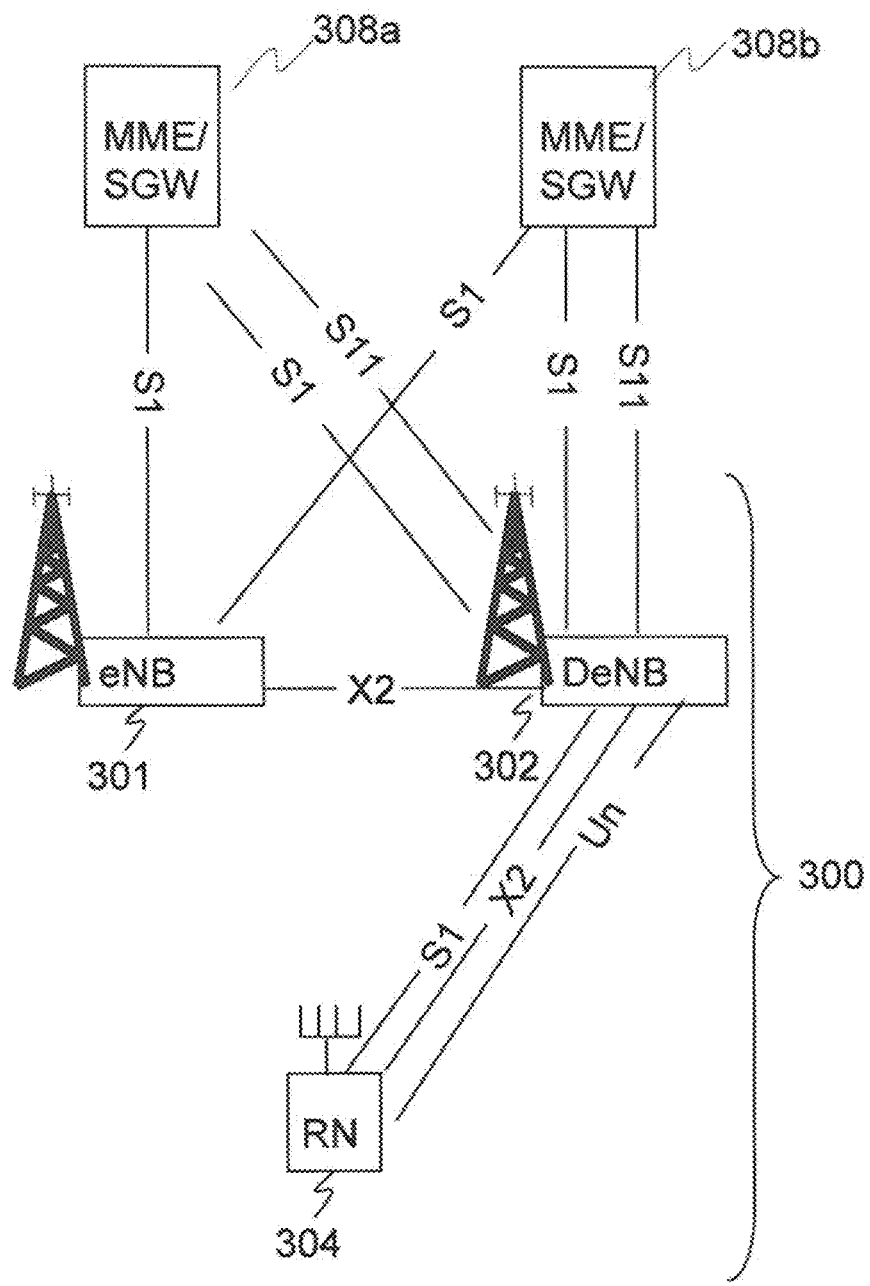
FIG. 3 is a schematic illustration of the overall architecture for RNs in an E-UTRAN.
Figure 4A:
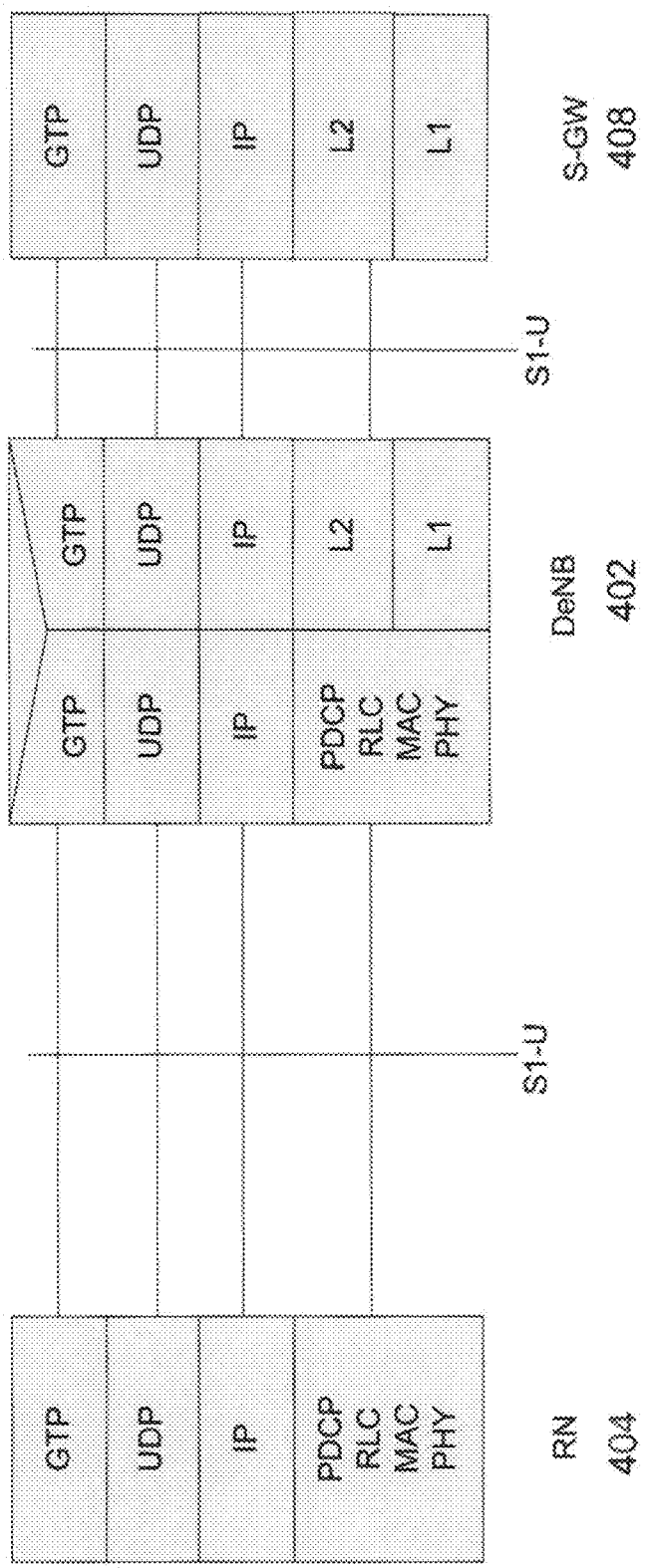
FIG. 4a is a schematic illustration of the S1 user plane protocol stacks for supporting RNs.
Figure 4B:
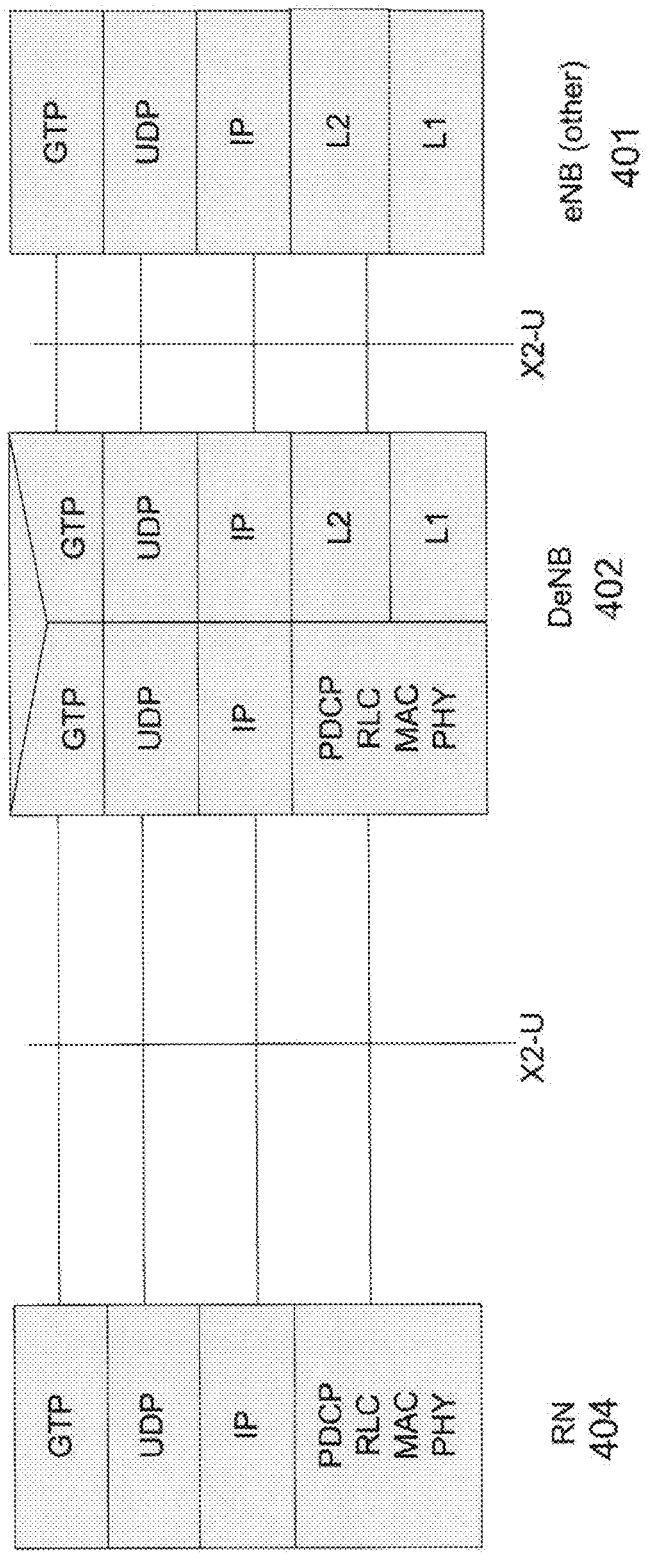
FIG. 4b is a schematic illustration of the X2 user plane protocol stacks for supporting RNs.
Figure 5:
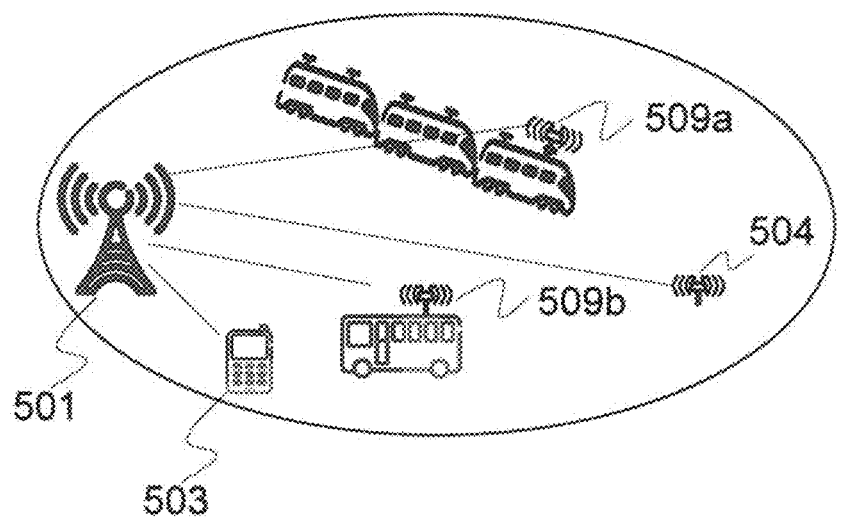
FIG. 5 is a schematic illustration of a mobile RN usage scenario.
Figure 6:
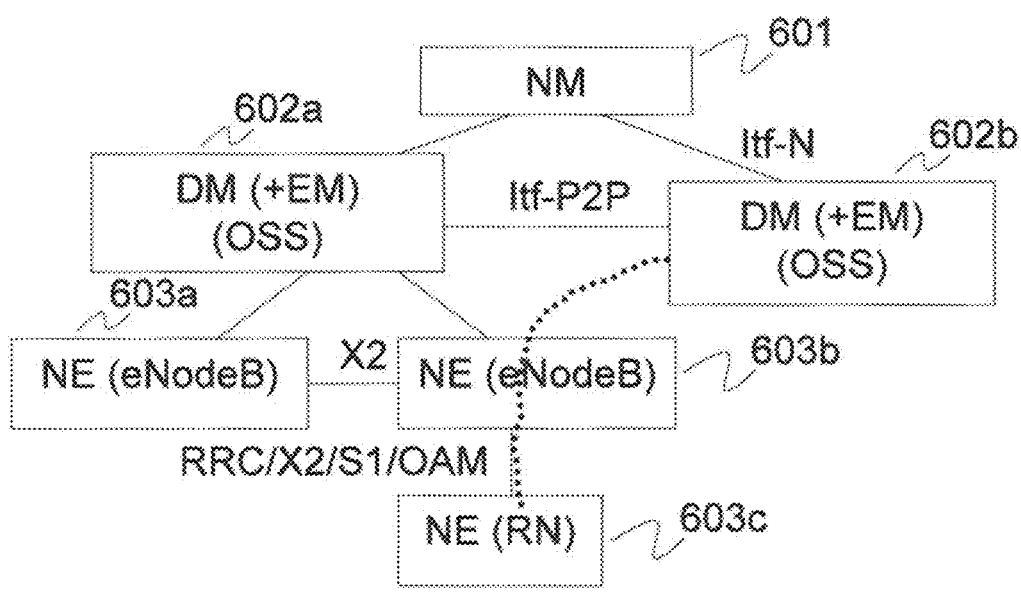
FIG. 6 is a schematic illustration of an OAM architecture for a case when the DeNB is managed by a DM/EM that is different from the DM/EM of the RN.

Embodiments are described in a non-limiting general context in relation to an example scenario in an advanced LTE network with a mobile RN cell covering a vehicle, such as the one illustrated in FIG. 5. The vehicle may house the mobile RN somewhere on the outside of the vehicle such as on the top of it as illustrated in FIG. 5, but it may also be placed somewhere on the inside of the vehicle. It should also be noted that the embodiments may be applied to any type of radio access network, as well as to scenarios which does not involve mobile RNs, such as the coffee shop scenario described above covered by a pico base station or a WiFi access point.

Embodiments herein include two different methods or approaches for limiting a UE's selection of a mobile RN to circumstances in which the UE is located inside the premises of a vehicle housing the mobile RN. One approach is network based and the other one is UE based.

According to at least one mobile RN based embodiment, which is an example embodiment of the network based approach, a method in a mobile relay includes determining the location of the UE based on certain measurements, and selectively admitting the UE based on whether or not the determined location of the UE corresponds to a location inside the vehicle in which the mobile RN is installed. The method may optionally further include redirecting the UEs which are not located inside the vehicle to access another radio network node. An advantage of the network based embodiments is that they are applicable to a legacy UE.

According to at least one UE based embodiment, which is an example embodiment of the UE based approach, a method in a UE includes acquiring information about the premises or boundaries such as present coordinates of the vehicle housing the mobile RN, determining the location of the UE, and autonomously camping on or attempting to connect to the mobile RN provided the determined UE location is within the acquired premises of the vehicle. The coordinates define the present geographical location of said vehicle housing the mobile RN. For example the information associated with the coordinates may be expressed in terms of longitude and latitudes, which in turn are defined in degrees. Said information may also contain additional contents such as a direction of each set of coordinate. The direction for example may be expressed in terms of south or north latitude and east or west longitude.

Network Based Approach

In this section, the network based approach is described. A specific example embodiment based on the mobile RN scenario is first described, and a more general embodiment is then described.

According to one mobile RN based embodiment, the mobile RN performs and uses at least the following two measurements for admitting or selecting the UE:
- Propagation delay (Dp) between the UE and the mobile RN
- Angle of arrival (AoA)

The propagation delay measurement may have different variants. Some examples are:
- Rx-Tx time difference measurement performed by the mobile RN or by the UE. Rx-Tx time difference is interchangeably called round trip time (RTT). RTT is twice the one way propagation delay.
- Timing advance (Tadv). Tadv is derived from UE Rx-Tx time difference measurement or mobile RN Rx-Tx time difference measurement or a combination thereof.

In more detail, embodiments of a method in a mobile RN of admitting a UE comprises of multiple steps or actions described below:

i. This is an optional step, in which the mobile RN obtains the UE speed. The UE speed may, if known at the source eNB, for example be sent to the mobile RN when a cell change such as a handover (HO) request is sent. For the case of X2 HO, the UE speed could be included in the HANDOVER REQUEST X2 command, e.g. as part of the UE history information. In case of S1 HO, the UE speed could be included in the UE history information that is part of the source to target transparent container Information Element (IE). The IE is included in the S1 HANDOVER REQUIRED message, which is later sent out to the mobile RN via the MME in an S1 HANDOVER REQUEST message. The mobile RN could also try to measure the UE speed by itself, using any prior art method. The UE speed may e.g. be determined by measuring the Doppler frequency. The speed can be measured by the mobile RN based on an uplink received signal when the UE sends a random access, or on any signal in the uplink for initiating access to the mobile RN. The mobile RN may also temporarily assign resources to the UE for uplink transmission for the purpose of measuring the UE speed. If the UE speed is zero or its magnitude is within a certain threshold ($\gamma$) with respect to the vehicle or with respect to the mobile RN, then the mobile RN performs the actions described in step ii to iv. Otherwise the UE is not admitted and may perform relevant actions in steps v and vi. The donor node, which may be a DeNB, may also configure the mobile RN with parameters such as the threshold $\gamma$. The configuration may be done by the signaling exchange between the mobile RN and the donor node.

ii. In this step the mobile RN preferably performs at least one of the above stated two measurements, i.e. Dp and AoA. The UE may send a random access or any signal to initiate an access to the mobile RN. The UE may also temporarily be assigned resources for uplink transmission enabling the mobile RN to more accurately perform measurements. In one example, the UE may be assigned resources for continuous uplink transmission of a signal such as Channel Status Information (CSI) over a certain time period T0. The CSI reports are type of measurements which are used by the network for scheduling and resource assignment. Examples of CSI reports are Channel Quality Indicator (CQI), Rank Indicator (RI) and pre-coding matrix indicator (PMI) reports. Alternatively or additionally to the Dp and/or AoA measurements, the UE can measure the RTT and send this to mobile RN during a temporary connection, i.e. over a time period T0. The donor node may configure the mobile RN with the parameter T0, which involves signaling exchange between the mobile RN and the donor node. Yet another possibility is to use the RTT measured by both the UE and the mobile RN to derive an enhanced Tadv In one embodiment, the measurements are done by the mobile RN on transmitted and/or received signals. Some examples are:
- The AoA is measured by the mobile RN on signals received from the UE.
- The RTT or a similar measurement is done on signals received from the UE and on signals transmitted by the mobile RN.

iii. In this step the mobile RN uses the performed measurements to determine the location of the UE with respect to the mobile RN. The mobile RN may have a separate control unit capable of translating the measurements into a physical location of the UE with respect to the location of the mobile RN in the vehicle.

iv. In this step the mobile RN determines whether the UE is located inside the vehicle or not. The determination could be done by comparing with a pre-determined geometric boundary of the vehicle. The vehicle boundary could be measured manually, using e.g. measurement tapes, or a laser based method, and configured statically in the mobile RN during initial configuration. The boundary could also be determined via other means such as using A-GNSS or GNSS devices. A scenario could also be envisioned where the vehicle dimensions change and where the vehicle can communicate the new dimensions to the mobile RN when changes are made. One example scenario may be a train with several wagons, where the number of wagons can change at some stations.

v. In this step the mobile RN may admit the UE in the cell covering the vehicle, provided that the UE is determined to be located inside the vehicle in step iv. If the UE is admitted, the mobile RN assigns resources to the UE for further communication and connection establishment. If the UE is not admitted, the mobile RN may send a message or command that the UE has not been admitted, e.g. a non-acknowledgement (NACK) as random access response. The donor node, e.g. the DeNB, serving the mobile RN may also be involved in the decision to admit or reject the UE to the mobile RN. In this case signaling may be exchanged between the mobile RN and its donor node, whereby the donor node finally permits or rejects the admission of the UE to the mobile RN.

vi. In this step, also being an optional step, the mobile RN may redirect the UE towards another target cell in case the UE is determined to be located outside the vehicle boundary.

The steps of the method described above are not necessarily performed in the above described order. Step i may e.g. be performed later, as will be described below with reference to FIG. 7c. The method described above is applicable to admitting the UE to the mobile RN in all mobility scenarios including change from idle to connected state, and cell changes in connected states. Cell changes in connected states comprises e.g.:
- Handover, i.e. when the UE attempts to access mobile RN in response to a handover command received from the old serving node, such as the old serving eNB;
- Primary cell change (PCell) or primary component carrier change (PCC) in e.g. a carrier aggregation scenario, or in a Coordinated Multipoint (CoMP) distributed antenna system (DAS) scenario;

RRC connection re-establishment to the mobile RN;

RRC connection release with redirection to the mobile RN.

Figure 7A:
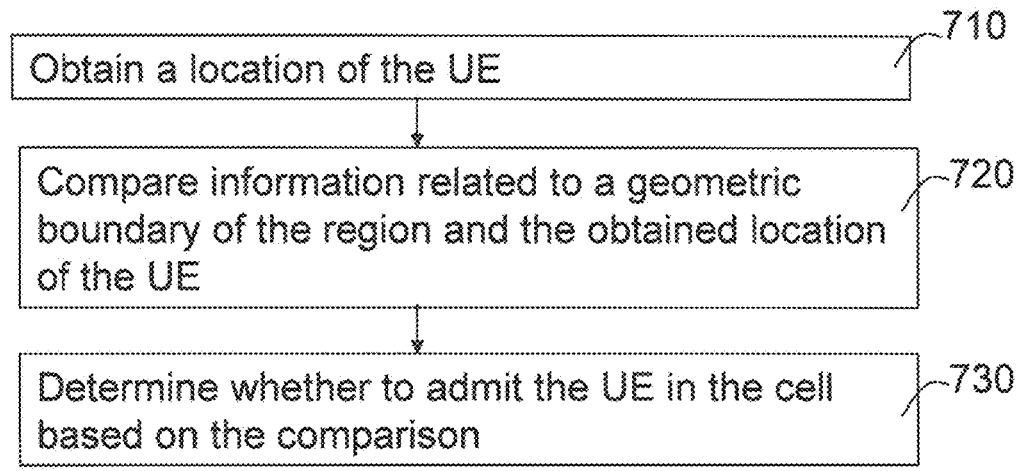
FIGS. 7a-c are flowcharts illustrating the method in a radio network node according to embodiments.

FIG. 7a is a flowchart illustrating an embodiment of a method in a radio network node of a cellular network, for controlling admission of a UE in a cell covering a region. The region may e.g. be the region within the boundaries of a vehicle or a coffee shop covered by the cell, as in the example embodiments described above, and the radio network node may e.g. be a mobile RN, or a base station such as an eNB, or a pico base station, or it may be a WiFi access point. The method comprises;

710: Obtaining a location of the UE. According to a first embodiment, is obtaining the location of the UE comprises determining the location based on measurements, as described in step ii above. The location may be determined based on at least one of a measurement of a propagation delay (Dp) between the UE and the radio network node, and an AoA of a signal received from the UE. The measurement of the propagation delay may be determined based on at least one of: an Rx-Tx time difference measurement measured by the UE; and an Rx-Tx time difference measurement measured by the radio network node. According to an alternative embodiment, obtaining the location of the UE comprises receiving the location of the UE from a further network node, or from the UE. The further network node may be one of a base station, a mobile RN, or a positioning node. In this embodiment the location may be determined using a positioning method, and the node which determines the UE location based on the positioning method may forward it to the radio network node. The location may be defined in relation to the radio network node, as described in step iii above, which is important in the scenario of the mobile RN. It may also be an absolute location.

720: Comparing information related to a geometric boundary of the region and the obtained location of the UE. The information related to the geometric boundary of the region may comprise a set of coordinates. The coordinates may e.g. define a geometric figure such as a rectangle, matching the boundary of the region.

730: Determining whether to admit the UE in the cell based on the comparison. The comparison makes it possible to determine if the UE is within the region or not, and thus if it should be admitted in the cell covering the region or not. In the scenario of the mobile RN on the vehicle, it is thus possible to control that any UE outside the vehicle is not admitted in the cell.

Figure 7B:
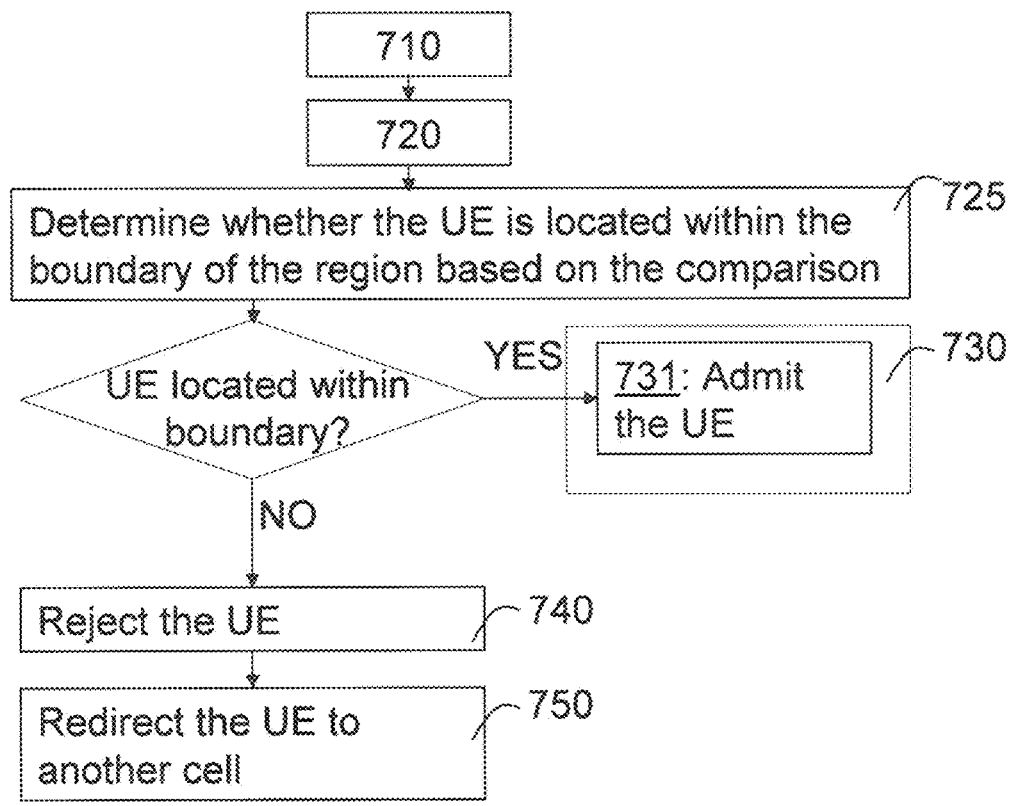

FIG. 7b is a flowchart illustrating another embodiment of the method in the radio network node. The method comprises in addition to the step 710 of obtaining the location of the UE, and step 720 of comparing the information related to the geometric boundary of the region and the obtained location of the UE, described with reference to FIG. 7a:

725: Determining whether the UE is located within the boundary of the region based on the comparison. One example of this step is described in step iv of the example embodiment above.

The step 730 of determining whether to admit the UE comprises, in step 731, admitting the UE when it is determined that the UE is located within the boundary of the region. The method further comprises step 740 of rejecting the UE when it is determined that the UE is not located within the boundary of the region, and the step 750 of redirecting the UE to another cell after rejecting. Step v above describes one example embodiment of step 730 and 740. Step vi illustrates an example of the redirecting of the UE in step 750.

In any of the embodiments described above with reference to FIGS. 7a and 7b, the radio network node may be a base station controlling the cell covering the region. In this case it is thus the target base station that controls the admission of the UE in the cell covering the region, i.e. the radio network node controlling the cell that the UE would like to access, e.g. after a handover. As it is the target base station that controls the admission, determining whether to admit the UE in the cell comprises determining whether to provide access to radio resources associated with the cell. The target base station may thus deny access to the radio resources associated with the cell covering the region, even if the UE is informed by its serving cell that it may perform e.g. a handover to the cell covering the region.

The embodiment described at the beginning of this section, with the mobile RN placed on the vehicle, is an example of where it is the target base station that controls the admission of the UE. The base station controlling the cell covering the region is thus a mobile RN in one embodiment. The information related to the geometric boundary of the region may be configured in the base station controlling the cell. This is typically done during initial configuration of the base station. Alternatively, the information related to the geometric boundary of the region may be determined by using a GNSS device.

Figure 7C:
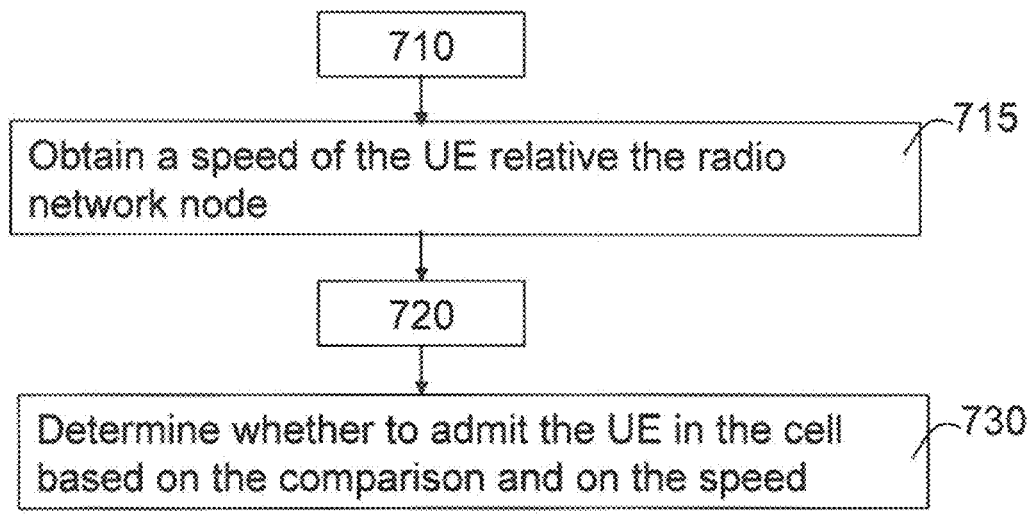

FIG. 7c is a flowchart illustrating still another embodiment of the method in the radio network node. This embodiment is typically applicable when the radio network node is the target base station, e.g. in the mobile RN case. The method comprises in addition to the step 710 of obtaining the location of the UE, and step 720 of comparing the information related to the geometric boundary of the region and the obtained location of the UE, described with reference to FIG. 7a:

715: Obtaining a speed of the UE relative the radio network node. Details on how this may be done is given in step i of the example embodiment described at the beginning of this section.

In this embodiment, step 730 of determining whether to admit the UE in the cell is based also on the obtained speed. The determining whether to admit the UE may be performed only if the speed of the UE is below a threshold, as described in step i above. The advantage of this embodiment is that it improves the certainty that only UEs within the vehicle are admitted into the cell. A UE which has a high speed relative the mobile RN is probably not a UE within the vehicle.

In an alternative embodiment, the radio network node is a base station controlling a serving cell of the UE, and not the cell covering the region. In this embodiment it is thus the serving base station that controls the admission of the UE in the cell covering the region, and not the target base station. Therefore, the step 730 of determining whether to admit the UE in the cell covering the region comprises determining whether to enable access to radio resources associated with the cell covering the region. The serving base station is the base station that determines whether to enable access to the radio resources of the cell by controlling if the UE should attempt initiating e.g. a handover to the cell covering the region.

Figure 8A:
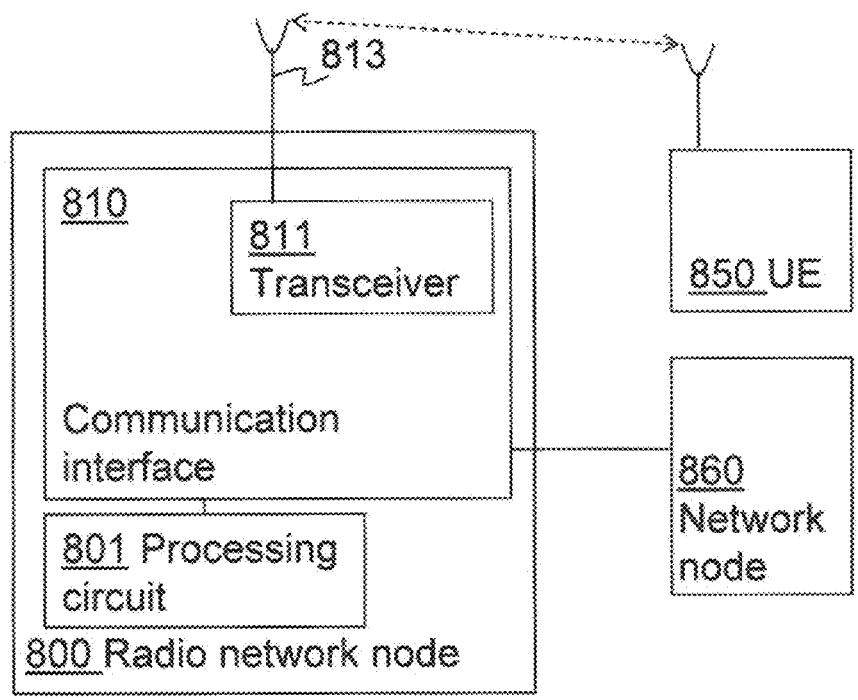
FIGS. 8a-b are block diagrams schematically illustrating a radio network node according to embodiments.

An embodiment of a radio network node 800 of a cellular network, configured to control admission of a UE 850 in a cell covering a region, is schematically illustrated in the block diagram in FIG. 8a. The radio network node 800 comprises a processing circuit 801 configured to obtain a location of the UE, to compare information related to a geometric boundary of the region and the obtained location of the UE, and to determine whether to admit the UE in the cell based on the comparison. The information related to the geometric boundary of the region may comprise a set of coordinates defining the boundary. The radio network node also comprises a communication interface 810, including a transceiver 811 coupled to one or more antennas 813 for communicating with the UE 850.

In one embodiment, the processing circuit 801 is further configured to determine whether the UE is located within the boundary of the region based on the comparison, and to admit the UE when it is determined that the UE is located within the boundary of the region. Further, the processing circuit 801 may be configured to reject the UE when it is determined that the UE is not located within the boundary of the region, and possibly also to redirect the UE to another cell after rejecting.

In one embodiment, the processing circuit 801 is configured to obtain the location of the UE by determining the location based on measurements. The location may be determined based on at least one of: a measurement of a propagation delay between the UE and the radio network node; and an AoA of a signal received from the UE. The measurement of the propagation delay may be determined based on at least one of: an Rx-Tx time difference measurement measured by the UE; an Rx-Tx time difference measurement measured by the radio network node.

In another embodiment, the processing circuit is configured to obtain the location of the UE by receiving the location of the UE from a further network node 860, or from the UE 850 using the communication interface 810. The location may be the result of a positioning method. The further network node 860 may be one of a base station, a mobile relay node, or a positioning node.

In any of the above described embodiment, the radio network node 800 may be a base station controlling the cell covering the region. The base station controlling the cell covering the region may be a mobile relay node. The information related to the geometric boundary of the region may be configured in the base station, or may be determined by using a GNSS device. The processing circuit 801 may be further configured to obtain a speed of the UE relative to the radio network node, and to determine whether to admit the UE in the cell based also on the obtained speed. In one embodiment the processing circuit 801 is configured to determine whether to admit the UE only if the speed of the UE is below a threshold. Determining whether to admit the UE in the cell may in embodiments comprise determining whether to provide access to radio resources associated with the cell.

As an alternative to the radio network node 800 being a base station controlling the cell covering the region, the radio network node 800 may be a base station controlling a serving cell of the UE. In this case, determining whether to admit the UE in the cell covering the region comprises determining whether to enable access to radio resources associated with the cell covering the region.

The circuits described above with reference to FIG. 8a may be logical circuits, separate physical circuits or a combination of both logical and physical circuits.

Figure 8B:
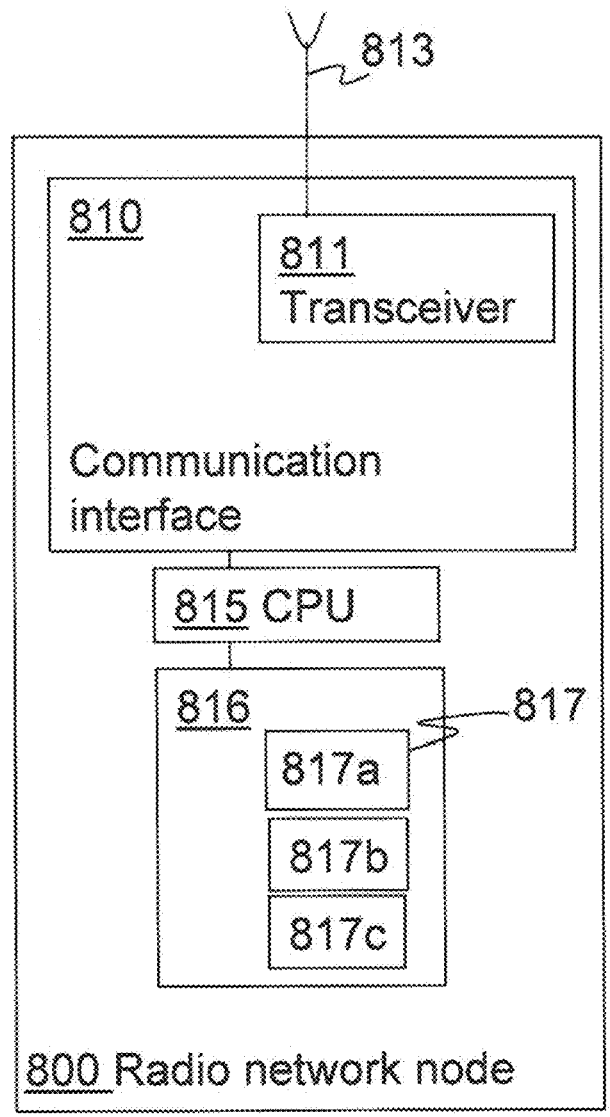

FIG. 8b schematically illustrates an embodiment of the radio network node 800, which is an alternative way of disclosing the embodiment illustrated in FIG. 8a. The radio network node 800 comprises a communication interface 810 comprising a transceiver 811 connected to an antenna 813 via an antenna port, as already described above with reference to FIG. 8a. The radio network node 800 also comprises a Central Processing Unit (CPU) 815 which may be a single unit or a plurality of units. Furthermore, the radio network node 800 comprises at least one computer program product (CPP) 816 in the form of a non-volatile memory, e.g. an EEPROM (Electrically Erasable Programmable Read-Only Memory), a flash memory or a disk drive. The CPP 816 comprises a computer program 817, which comprises code means which when run on the radio network node 800 causes the CPU 815 on the radio network node 800 to perform steps of the procedure described earlier in conjunction with FIG. 7a.

In the embodiment described, the code means in the computer program 817 of the is radio network node 800 comprises a module 817a for obtaining a location of the UE, a module 817b for comparing information related to the geometric boundary of the region and the obtained location, and a module 817c for determining whether to admit the UE in the cell based on the comparison. The code means may thus be implemented as computer program code structured in computer program modules. The modules 817a-c essentially perform the steps 710, 720, and 730 of the flow in FIG. 7a to emulate the radio network node illustrated in FIG. 8a. In other words, when the modules 817a-c are run on the CPU 815, they correspond to the processing circuit 801 of FIG. 8a.

Although the code means in the embodiment disclosed above in conjunction with FIG. 8b are implemented as computer program modules, they may in alternative embodiments be implemented at least partly as hardware circuits.

UE Based Approach

In this section, the UE based approach is described. A specific example embodiment based on the mobile RN scenario is first described, and a more general embodiment is described thereafter.

According to the UE based approach in a mobile RN scenario, the UE autonomously takes decision whether to connect to the mobile RN or not based on:

Pre-determined rules, and

Acquired information related to mobile RN coverage area.

The UE based approach therefore requires a method in the UE as well as a method in a mobile RN, a base station/eNB, or a WiFi access point. Both methods are described below.

The method in the UE when the UE attempts to access the mobile RN comprises of multiple steps or actions as described below;

A. In this step the UE acquires, receives or obtains information about the premises, such as the present physical coordinates of the geometric boundary of the vehicle housing the mobile RN. The information may be acquired by the UE by one or more mechanisms, such as:

By reading system information of the mobile RN;

From a serving node, e.g. an eNB, in a command or message sent to the UE when changing cell. The information may e.g. be sent in a cell change or handover command, or in an RRC connection release with redirection message.

B. In this step the UE determines its location based on any suitable positioning method, e.g., A-GNSS, GNSS, E-CID, UTDOA, OTDOA, or fingerprinting described above. The E-CID method may use the same measurements as used in the network based solution above, e.g.

Tadv and AoA, or other measurements such as RSRP, RSRQ, and/or UE Rx-Tx time difference measurements.

C. In this step the UE determines whether it is located within the present premises of the vehicle housing the mobile RN. The determination is done by comparing its location with the information about the premises or physical/geographical coordinates such as the present coordinates of the vehicle acquired in step A.

D. In this step, which may be an optional step, the UE may also estimate its speed with respect to the mobile RN based on a prior art method. The speed may e.g. be estimated based on a Doppler frequency of reference signals received from the mobile RN. If the UE speed is zero or its magnitude is within a certain threshold, then the UE proceeds with step E. Otherwise the UE reverts to the old cell or accesses another cell such as the strongest cell.

E. In this step the UE camps on or attempts to connect to mobile RN based on the comparison in step C between the UE's location and the acquired coordinates of the vehicle. If the UE is located inside the vehicle then the UE will attempt access to radio resources associated with a cell covering the vehicle. Otherwise the UE reverts to the old cell, or attempts access to another cell, e.g. the strongest cell.

Steps A-E above may not necessarily be performed in the order described above. Step D may e.g. be performed earlier. A corresponding method in the mobile RN may in embodiments comprise the steps of:

a. Signaling to the UE the information about the present premises or physical coordinates of the vehicle housing the mobile RN. This step corresponds to step 1 in the UE method described above. There may be high requirements on how often the physical coordinates should be broadcasted. If the mobile RN is in a fast train traveling at 300 km/h (83 m/s), the coordinates have to be broadcasted in the range of once every few hundred milliseconds. On the other hand, on city buses or trams that are traveling at moderate speed of around 50 km/h (14 m/s), the broadcasting of the coordinates can be made less frequently, with typically several seconds between the broadcasts. The information related to the geometric boundary of the vehicle premises can be signaled on a common channel, e.g. in a system information block on a broadcast channel, However, the information may also be signaled on a dedicated or UE specific channel, e.g. on a Dedicated Control Channel (DCCH) or on a Physical Downlink Shared channel (PDSCH), as part of cell change or handover command. It may also be sent in a message to the UE for other mobility actions, e.g. RRC connection release with redirection message.

b. Signaling or forwarding the information about the present premises or physical coordinates of the vehicle housing the mobile RN to other network nodes, such as another mobile RN, a donor node, or a radio network node e.g. an eNB, an Radio Network Controller (RNC), or a base station. The information may be signaled to other network nodes proactively, or based on request from another node. Furthermore, the information about the present premises may be signaled periodically or at specific occasion, e.g. when the vehicle becomes stationary, when it passes special locations, when a cell change is likely to occur, or when the vehicle's present geographical coordinates have changed. This other network node may e.g. be the radio network node serving the UE, which forwards the received information about the present premises to the UE, using the signaling described in the previous step a. The UE may then use the information when deciding whether to access radio resources associated with a cell during a cell change or handover procedure.

The methods described above are applicable to admission of the UE to the mobile RN cell in all mobility scenarios previously described.

Figure 9A:
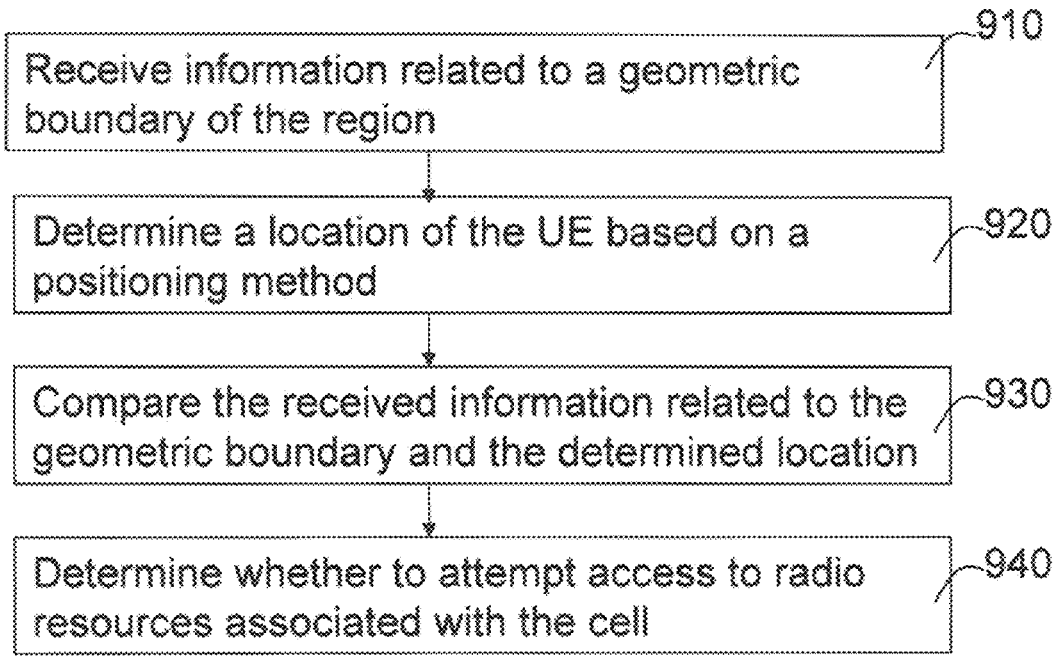
FIGS. 9a-c are flowcharts illustrating the method in a UE according to embodiments.

FIG. 9a is a flowchart illustrating an embodiment of a method in a UE of a cellular network, for controlling access attempts to radio resources associated with a cell covering a region. The region may e.g. be the region within the boundaries of a vehicle or a coffee shop covered by the cell, as in the example embodiments described above. The method comprises:

910: Receiving information related to a geometric boundary of the region. This step corresponds to step #1 of the mobile RN embodiment described previously in this section. The information related to the geometric boundary of the region may comprise a set of coordinates defining the boundary. The information related to the geometric boundary of the region may be received from a radio network node controlling a serving cell of the UE, e.g. from a serving eNB in a handover command. Alternatively, the information related to the geometric boundary of the region may be received from a radio network node controlling the cell covering the region, e.g. in system information from the radio network node.

920: Determining a location of the UE based on a positioning method. In step #2 above, details about possible positioning methods are given.

930: Comparing the received information related to the geometric boundary and the determined location.

940: Determining whether to attempt access to radio resources associated with the cell based on the comparison.

Figure 9B:
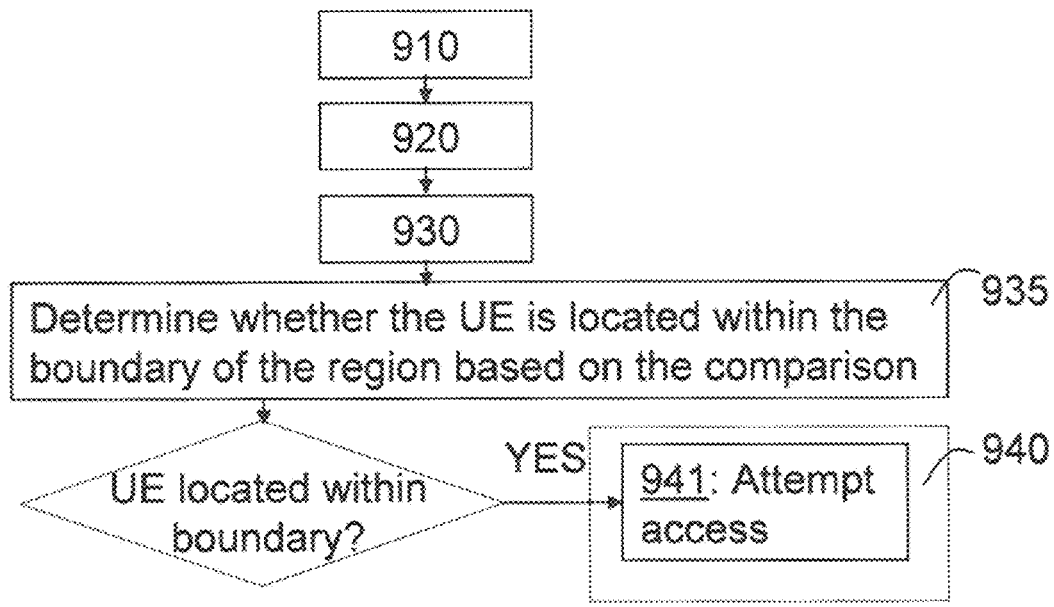

FIG. 9b is a flowchart illustrating another embodiment of the method in the UE. The method comprises the following step, in addition to step 910 of receiving information related to the geometric boundary of the region, step 920 of determining a location of the UE, and step 930 of comparing the received information related to the geometric boundary and the determined location, described with reference to FIG. 9a:

935: Determining whether the UE is located within the boundary of the region based on the comparison. One example of this step is described in step #3 of the previous example embodiment in this section.

The step 940 of determining whether to attempt access to radio resources associated with the cell, comprises attempting access, 941, when it is determined that the UE is located within the boundary of the region. See also step #5 above.

Figure 9C:
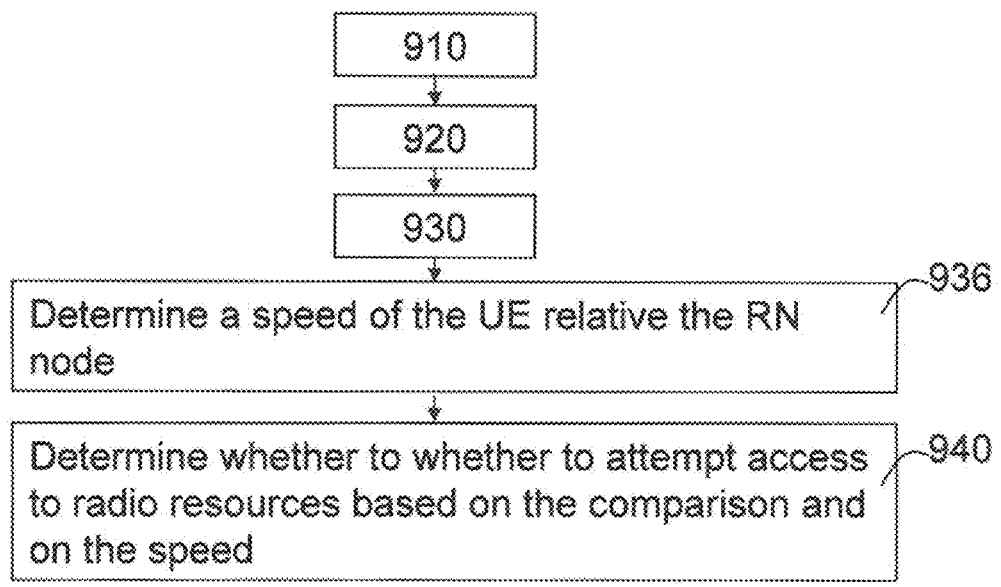

In one embodiment, illustrated by the flowchart in FIG. 9c, the radio network node controlling the cell covering the region is a mobile RN, and the location of the UE is determined relative the mobile RN. The method may in this embodiment further comprise:

936: Determining a speed of the UE relative the mobile RN. See also example in step #4 above.

Determining whether to attempt access to radio resources associated with the cell in step 940 is in this embodiment based also on the determined speed, and not only on the comparison in step 930. The determining whether to attempt access to radio resources associated with the cell may be performed only if the speed of the UE is below a threshold.

The advantage of this is that it may give a more correct determination of whether the UE is within the region or not. A UE with a high speed relative the mobile RN is probably not within the region of the vehicle.

Figure 10:
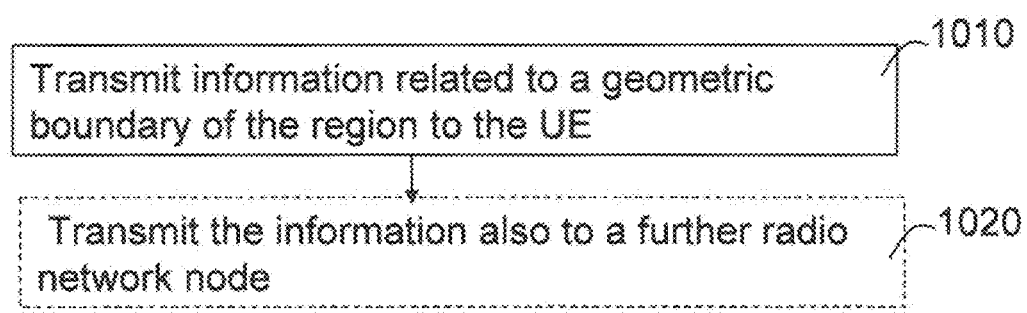
FIG. 10 is a flowchart illustrating the method in a radio network node according to embodiments.

FIG. 10 is a flowchart illustrating an embodiment of a method in a radio network node of a cellular network, for supporting a UE's access to radio resources associated with a cell controlled by the radio network node, wherein the cell is covering a region. The radio network node controlling the cell may be a mobile RN as in the above described embodiment, or it may be a base station or a WiFi access point. The method comprises:

1010: Transmitting information related to a geometric boundary of the region to the UE, such that the UE can determine whether to attempt access to radio resources associated with the cell based on a comparison of the information related to the geometric boundary and a location of the UE.

The method may in one embodiment optionally also comprise:

1020: Transmitting the information related to the geometric boundary of the region also to a further radio network node. The geometric boundary may be transmitted to the further radio network node in one of the following ways: proactively; periodically based on a request from the further radio network node; or at specific occasions. Some examples of this are given in step b above.

The information related to the geometric boundary of the region may alternatively also be transmitted to the UE via a radio network node controlling a serving cell of the UE. In the mobile RN scenario, the mobile RN will thus signal the geometric boundary information to the base station controlling the UE's serving cell, which in turn will signal the information to the UE.

Figure 11A:
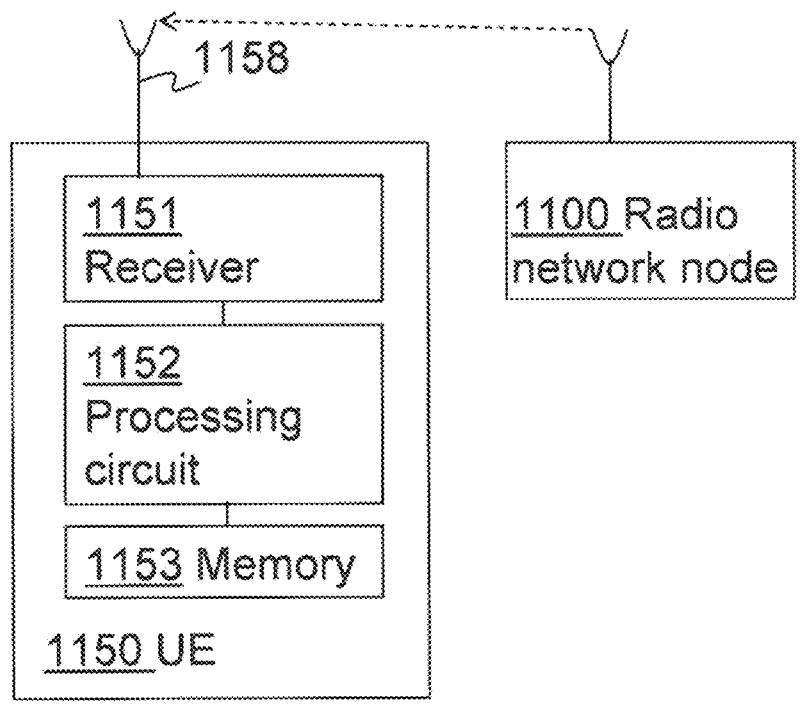
FIGS. 11a-b are block diagrams schematically illustrating a UE according to embodiments.

An embodiment of a UE 1150 of a cellular network, configured to control access attempts to radio resources associated with a cell covering a region, is schematically illustrated in the block diagram in FIG. 11a. The UE 1150 comprises a receiver 1151 coupled to one or more antennas 1158 via an antenna port, where the receiver 1151 is configured to receive information related to a geometric boundary of the region. The receiver may be configured to receive the information related to the geometric boundary of the region from a radio network node 1100 controlling a serving cell of the UE. Alternatively, the receiver may be configured to receive the information related to the geometric boundary of the region from a radio network node controlling the cell.

The UE 1150 also comprises a processing circuit 1152 configured to determine a location of the UE based on a positioning method, compare the received information related to the geometric boundary and the determined location, and determine whether to attempt access to radio resources associated with the cell based on the comparison. The UE 1150 may also comprise a memory 1153 for storing e.g. information related to the geometric boundary of the region. The information related to the geometric boundary of the region may comprise a set of coordinates defining the geometric boundary.

The processing circuit 1152 is in one embodiment further configured to determine whether the UE is located within the boundary of the region based on the comparison, and to determine whether to attempt access to radio resources associated with the cell by attempting access when it is determined that the UE is located within the boundary of the region.

In one embodiment, the radio network node controlling the cell is a mobile RN, and the location of the UE is determined relative the mobile RN. The processing circuit 1152 may be further configured to determine a speed of the UE relative the mobile RN, and to determine whether to attempt access to radio resources associated with the cell based also on the determined speed. The processing circuit 1152 may be configured to determine whether to attempt access to radio resources associated with the cell only if the speed of the UE is below a threshold.

The circuits described above with reference to FIG. 11a may be logical circuits, separate physical circuits or a combination of both logical and physical circuits.

Figure 11B:
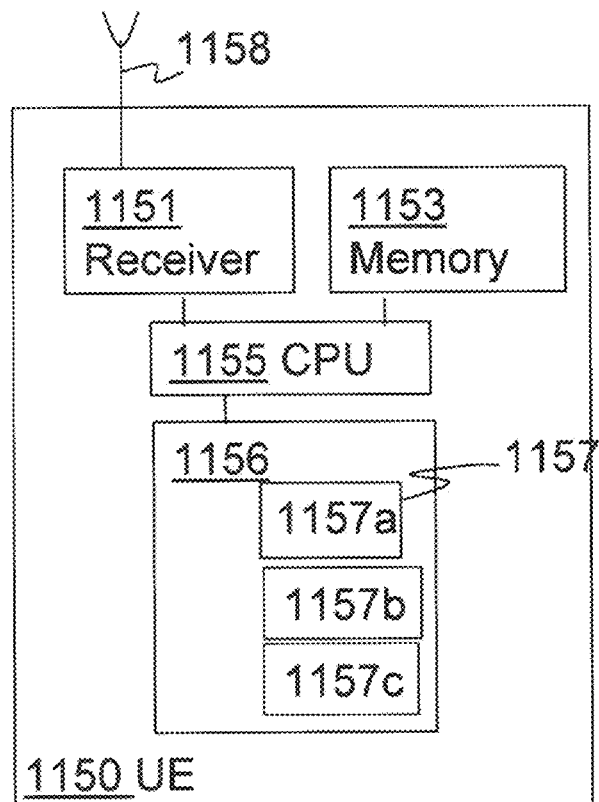

FIG. 11b schematically illustrates an embodiment of the UE 1150, which is an alternative way of disclosing the embodiment illustrated in FIG. 11a. The UE 1150 comprises the receiver 1151 coupled to the antenna 1158 and the memory 1153, as already described above with reference to FIG. 11a. The UE 1150 also comprises a Central Processing Unit (CPU) 1155 which may be a single unit or a plurality of units. Furthermore, the UE 1150 comprises at least one computer program product (CPP) 1156 in the form of a non-volatile memory, e.g. an EEPROM, a flash memory or a disk drive. The CPP 1156 comprises a computer program 1157, which comprises code means which when run on the UE 1150 causes the CPU 1155 on the UE 1150 to perform steps of the procedure described earlier in conjunction with FIG. 9a.

In the embodiment described, the code means in the computer program 1157 of the UE 1150 comprises a module 1157a for determining a location of the UE, a module 1157b for comparing the received information related to the geometric boundary of the region and the determined location, and a module 1157c for determining whether to attempt access to radio resources associated with the cell based on the comparison. The code means may thus be implemented as computer program code structured in computer program modules. The modules 1157a-c essentially perform the steps 920, 930, and 940 of the flow in FIG. 9a to emulate the UE illustrated in FIG. 11a. In other words, when the modules 1157a-c are run on the CPU 1155, they correspond to the processing circuit 1152 of FIG. 11a.

Although the code means in the embodiment disclosed above in conjunction with FIG. 11b are implemented as computer program modules, they may in alternative embodiments be implemented at least partly as hardware circuits.

Figure 12:
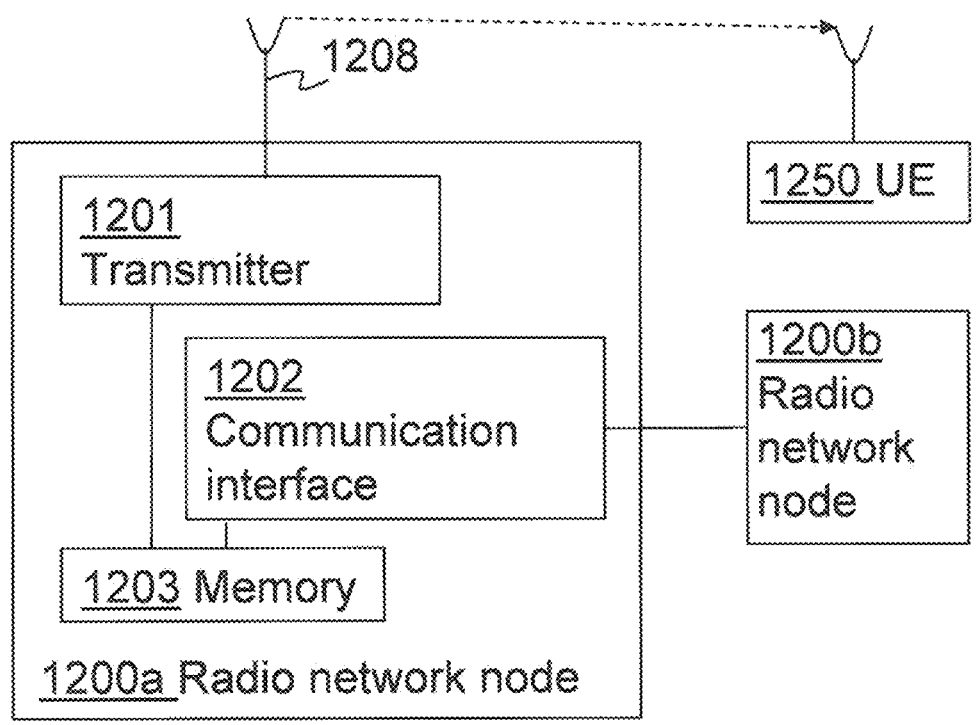
FIG. 12 is a block diagram schematically illustrating a radio network node according to embodiments.

An embodiment of a radio network node 1200a of a cellular network, for supporting a UE's 1250 access to radio resources associated with a cell controlled by the radio network node, wherein the cell is covering a region, is schematically illustrated in the block diagram in FIG. 12. The radio network node controlling the cell may be a mobile relay node, or a base station. The radio network node 1200a comprises a transmitter 1201 configured to transmit information related to a geometric boundary of the region to the UE, such that the UE can determine whether to attempt access to radio resources associated with the cell based on a comparison of the information related to the geometric boundary and a location of the UE. The transmitter 1201 is connected to an antenna 1208 via an antenna port for the transmission. The radio network node may in embodiments further comprise a communication interface 1202 configured to transmit the information related to the geometric boundary of the region to a further radio network node 1200b. The communication interface 1202 may be configured to transmit information related to the geometric boundary to the further radio network node 1200b in one of the following ways: proactively; periodically based on a request from the further radio network node; or at specific occasions. In an alternative embodiment, the communication interface 1202 is configured to transmit the information related to the geometric boundary of the region to the UE via a radio network node controlling a serving cell of the UE.

The circuits described above with reference to FIG. 12 may be logical circuits, separate physical circuits or a combination of both logical and physical circuits.

The above mentioned and described embodiments are only given as examples and should not be limiting. Other solutions, uses, objectives, and functions within the scope of the accompanying patent claims may be possible.

ABBREVIATIONS

3GPP 3rd Generation Partnership Project
ANR Autonomous Neighbor Relation
AoA Angle of Arrival
A-GNSS Assisted GNSS
A-GPS Assisted GPS
CGI Cell Global Identity
DeNB Donor eNodeB
DM Domain Management
E-SMLC Evolved SMLC
eNB/eNodeB enhanced Node B
GNSS Global Navigation Satellite System
GPS Global Positioning System
GW Gateway
HARQ Hybrid Automatic Repeat-reQuest
HSPA High Speed Packet Access
LTE Long-Term Evolution
LMU Location Measurement Unit
MME Mobility management entity
MDT Minimization of Drive Tests
NM Node Management
NRT Neighbor Relation Table
OAM/O&M Operation and Maintenance
OSS Operational Support Systems
OTDOA Observed Time Difference Of Arrival
PCI Physical Cell Identity
PRS Positioning Reference Signal
RLF Radio Link Failure
RN Relay Node
RNC Radio link controller
RRC Radio Resource Control
RSRP Reference Signal Received Power
RSRQ Reference Signal Received Quality
RSTD Reference Signal Time Difference
SGW Service GW
SI System Information
SMLC Serving Mobile Location Center
SON Self Organizing Network
Tadv Timing Advance
UE User Equipment
UMTS Universal Mobile Telecommunications System
UTDOA Uplink Time Difference Of Arrival

The invention claimed is:

1. A method in a radio network node of a cellular access network for controlling mobility of a user equipment from a source cell to a particular target cell, wherein the source cell and the particular target cell are in the cellular access network and are of the same access technology, the method comprising:
   at the radio network node, obtaining a location of the user equipment;
   at the radio network node, comparing the obtained location of the user equipment and information representing a geometric boundary of a region within a coverage area of the particular target cell, wherein the geometric boundary of the region is either the boundary of a vehicle that is within the coverage area of the particular target cell, or is within and fixed relative to the boundary of a vehicle that is within the coverage area of the particular target cell;
   at the radio network node, determining whether the user equipment is located within the geometric boundary of the region based on the comparison; and
   at the radio network node, determining whether to allow the user equipment to switch from accessing the network via the source cell to accessing the network via the particular target cell based on the determination of whether the user equipment is located within the geometric boundary of the region, including determining to allow the user equipment when it is determined that the user equipment is located within the geometric boundary of the region.

2. The method according to claim 1, wherein the method further comprises rejecting the user equipment from performing said switch when it is determined that the user equipment is not located within the geometric boundary of the region.

3. The method according to claim 2, wherein the method further comprises redirecting the user equipment to another cell after said rejecting.

4. The method according to claim 1, wherein the information related to the geometric boundary of the region comprises a set of coordinates.

5. The method according to claim 1, wherein obtaining the location of the user equipment comprises determining the location based on measurements, said measurements made based on one or more signals transmitted to or from a network node controlling the source cell or the particular target cell.

6. The method according to claim 5, wherein the location is determined based on at least one of:
   a measurement of a propagation delay between the user equipment and the radio network node; and
   an angle of arrival of a signal received from the user equipment.

7. The method according to claim 6, wherein the measurement of the propagation delay is determined based on at least one of:
   an Rx-Tx time difference measurement measured by the user equipment; and
   an Rx-Tx time difference measurement measured by the radio network node.

8. The method according to claim 1, wherein obtaining the location of the user equipment comprises receiving the location of the user equipment from a further network node, or from the user equipment.

9. The method according to claim 8, wherein the further network node is one of:
   a base station;
   a mobile relay node; or
   a positioning node.

10. The method according to claim 1, wherein the radio network node is a base station controlling the particular target cell.

11. The method according to claim 10, wherein the base station controlling the particular target cell is a mobile relay node.

12. The method according to claim 10, wherein the information representing the geometric boundary of the region is configured in the base station.

13. The method according to claim 10, wherein the information related to the geometric boundary of the region is determined by using a Global Navigation Satellite System, GNSS, device.

14. The method according to claim 10, further comprising obtaining a speed of the user equipment relative the radio network node, and wherein determining whether to allow the user equipment to switch to accessing the network via the particular target cell is based also on the obtained speed.

15. The method according to claim 14, wherein determining whether to allow the user equipment is performed only if the speed of the user equipment is below a threshold.

16. The method according to claim 10, wherein determining whether to allow the user equipment in the cell comprises determining whether to provide access to radio resources associated with the particular target cell.

17. The method according to claim 1, wherein the radio network node is a base station controlling the source cell.

18. The method according to claim 17, wherein determining whether to allow the user equipment in the particular target cell comprises determining whether to enable access to radio resources associated with the particular target cell.

19. The method of claim 1, wherein the region is smaller than the coverage area over which the particular target cell provides radio coverage.

20. The method of claim 1, further comprising, at the radio network node, allowing or rejecting the user equipment from said switching based on said determining, by allowing or rejecting the user equipment from accessing radio resources associated with the particular target cell.

21. A radio network node of a cellular access network, wherein the radio network node is configured to control mobility of a user equipment from a source cell to a particular target cell, wherein the source cell and the particular target cell are in the cellular access network and are of the same access technology, and wherein the radio network node comprises a processing circuit and memory, the memory containing instructions executable by the processing circuit whereby the radio network node is configured to:
  obtain a location of the user equipment;
  compare the obtained location of the user equipment and information representing a geometric boundary of a region within a coverage area of the particular target cell, wherein the geometric boundary of the region is either the boundary of a vehicle that is within the coverage area of the particular target cell, or is within and fixed relative to the boundary of a vehicle that is within the coverage area of the particular target cell;
  determine whether the user equipment is located within the geometric boundary of the region based on the comparison; and
  determine whether to allow the user equipment to switch from accessing the network via the source cell to accessing the network via the particular target cell based on the determination of whether the user equipment is located within the geometric boundary of the region, including determining to allow the user equipment when it is determined that the user equipment is located within the geometric boundary of the region.

22. The radio network node according to claim 21, wherein the processing circuit is further configured to reject the user equipment from performing said switch when it is determined that the user equipment is not located within the boundary of the region.

23. The radio network node according to claim 22, wherein the processing circuit is further configured to redirect the user equipment to another cell after said rejecting.

24. The radio network node according to claim 21, wherein the information representing the geometric boundary of the region comprises a set of coordinates.

25. The radio network node according to claim 21, wherein the processing circuit is configured to obtain the location of the user equipment by determining the location based on measurements, said measurements made based on one or more signals transmitted to or from the radio network node itself.

26. The radio network node according to claim 25, wherein the location is determined based on at least one of:
  a measurement of a propagation delay between the user equipment and the radio network node; and
  an angle of arrival of a signal received from the user equipment.

27. The radio network node according to claim 26, wherein the measurement of the propagation delay is determined based on at least one of:
  an Rx-Tx time difference measurement measured by the user equipment; and
  an Rx-Tx time difference measurement measured by the radio network node.

28. The radio network node according to claim 25, wherein the location is determined based on only:
  a measurement of a propagation delay between the user equipment and the radio network node itself; and
  an angle of arrival of a signal received by the radio network node itself from the user equipment.

29. The radio network node according to claim 21, wherein the processing circuit is configured to obtain the location of the user equipment by receiving the location of the user equipment from a further network node, or from the user equipment.

30. The radio network node according to claim 29, wherein the further network node is one of:
  a base station;
  a mobile relay node; or
  a positioning node.

31. The radio network node according to claim 21, wherein the radio network node is a base station controlling the particular target cell.

32. The radio network node according to claim 31, wherein the base station controlling the particular target cell is a mobile relay node.

33. The radio network node according to claim 31, wherein the information related to the geometric boundary of the region is configured in the base station.

34. The radio network node according to claim 31, wherein the information related to the geometric boundary of the region is determined by using a Global Navigation Satellite System, GNSS, device.

35. The radio network node according to claim 31, wherein the processing circuit is further configured to obtain a speed of the user equipment relative the radio network node, and to determine whether to allow the user equipment to switch to accessing the network via the particular target cell is based also on the obtained speed.

36. The radio network node according to claim 35, wherein the processing circuit is configured to determine whether to allow the user equipment only if the speed of the user equipment is below a threshold.

37. The radio network node according to claim 31, wherein determining whether to allow the user equipment in the cell comprises determining whether to provide access to radio resources associated with the particular target cell.

38. The radio network node according to claim 21, wherein the radio network node is a base station controlling the source cell.

39. The radio network node according to claim 38, wherein determining whether to allow the user equipment in the particular target cell comprises determining whether to enable access to radio resources associated with the particular target cell.

40. The radio network node of claim 21, wherein the region covered by the particular target cell is smaller than the coverage area over which the particular target cell provides radio coverage.

* * * * *